Patented Nov. 12, 1946

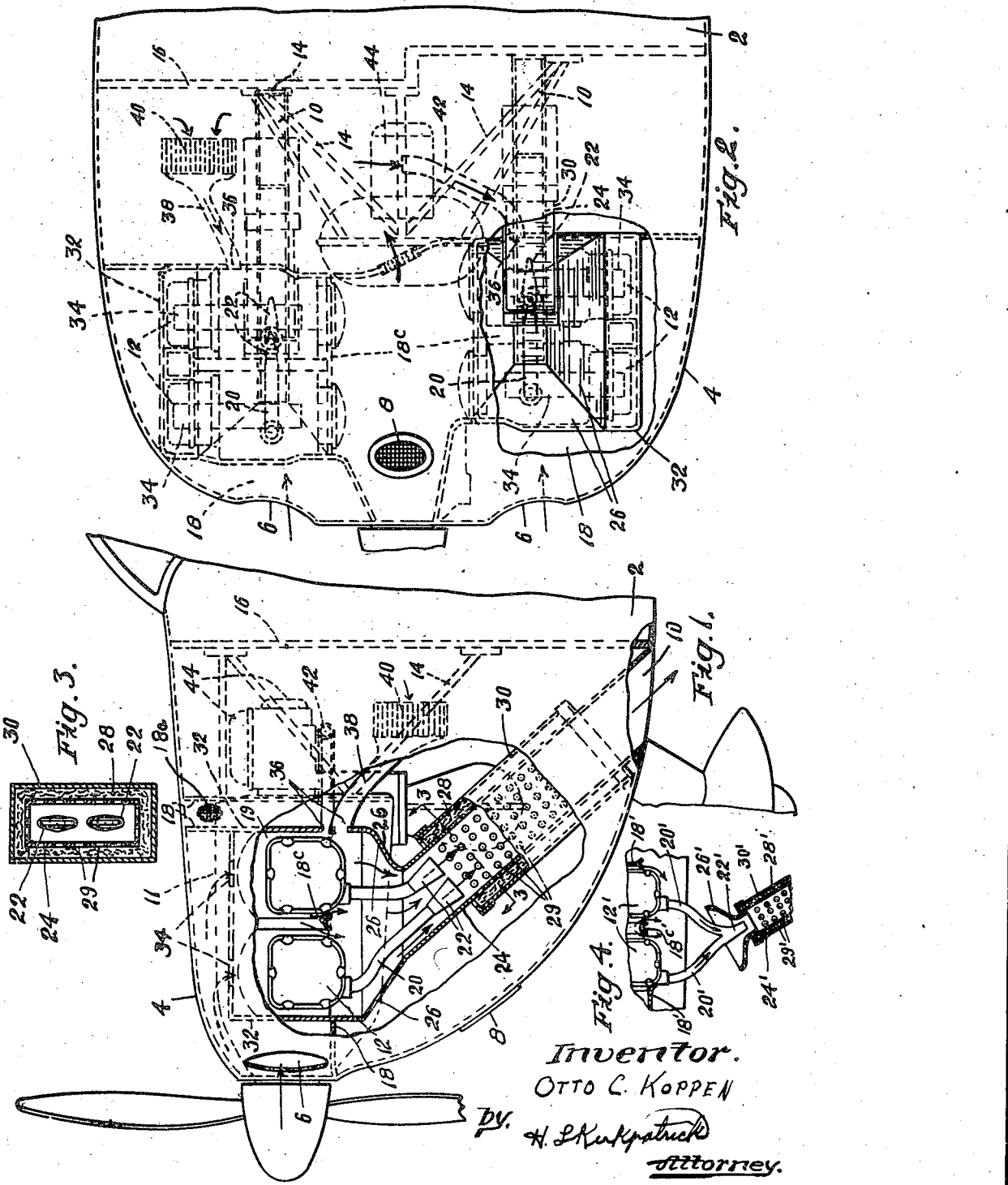

2,410,856

UNITED STATES PATENT OFFICE 2,410,856

AIRPLANE

Otto C. Koppen, Wellesley, Mass.

Application July 15, 1944, Serial No. 545,045

9 Claims. (Cl. 244—53)

This invention relates chiefly to powered aircraft, both fixed and rotating wing, and provides in combination therewith improved cooling and silencing means for internal combustion engines whereby effective engine cooling is provided with substantially no cooling drag, and whereby both engine exhaust and engine mechanical noises are materially reduced. The invention is of particular interest and value in connection with small air-cooled single-motor airplanes having engines located in or near the fuselage thereof, though it may also be applied to advantage in other types of airplanes including multi-motored planes.

Heretofore satisfactory engine cooling of engines of fixed-wing airplanes has been possible only at the expense of very substantial cooling drag at the cowl exit, commonly of the order of 15% of the drag of the entire airplane at best climbing speed, with resultant losses of 12–18% in rate of climb (depending upon available excess power) and of the order of 3% in cruising speed (at 75% power). Some present-day aircraft, especially fixed-wing pushers and rotating wing types, resort to blowers to air cool the motor with resultant loss of power to run the blower. Moreover, in present-day aircraft few attempts have been made to muffle exhaust noise because the mechanical noise still predominated and also because of the loss of power involved in the use of conventional exhaust mufflers. Also, heretofore, little or no attention has been given to reduction of the very considerable amount of mechanical engine noise escaping through air cooling outlets, or other rearward openings in engine enclosures.

The present invention provides a long-sought satisfactory solution for these problems whereby both exhaust and mechanical noises may be materially reduced and the engine at the same time satisfactorily cooled, with resultant important saving in aerodynamic parasitic drag and/or power.

In the drawing, which shows a typical preferred application of the invention in a present-day type of small single-motor airplane:

Fig. 1 is a side elevation, partly broken away, illustrating an embodiment of the invention in such an airplane, certain parts of the engine including the induction system being omitted for purposes of clarity;

Fig. 2 is a bottom plan view, also partly broken away, of the airplane of Fig. 1, though with the nose-wheel of the landing gear omitted;

Fig. 3 is a transverse section view on the line 3—3 of Fig. 1, and

Fig. 4 is a fragmentary side elevation partially in section, on a reduced scale, of a modified embodiment of the invention.

Referring to the airplane of Figs. 1 to 3 of the drawing, in which like numerals represent like parts, the fuselage or body portion 2 of the airplane (of single-engine tricycle-gear cabin type) includes a cowled nose portion 4, preferably completely closed-off by the cowling enclosure or envelope except for cooling air inlet openings 6, induction air inlet 8, and outlets 10 from each of which exhaust and cooling air are together emitted. The engine generally designated 11, here shown as of horizontally-opposed 4-cylinder conventional type, includes cylinders 12 and is suitably mounted by means of a motor mount 14 extending forwardly of the fire-wall 16. The cooling air entering through the openings 6 is suitably confined and guided by means of vertical and horizontal baffles 18 and inter-cylinder baffles 18c, so as to flow and escape from the engine only downwardly through and past the cylinder cooling fins 19 (the air flow being indicated by the arrows).

The general arrangement so far described is typical of prior art engine installations wherein the pressure drop required to cool the engine is normally produced by the difference between the dynamic pressure at the nose of the cowl and the pressure drop at open cowl air exists downwind of the engine, usually placed slightly ahead of the fire-wall or around a cowl ring. At low forward speeds of such airplanes, the dynamic pressure, reduced by the entrance loss caused by propeller slipstream rotation, is not large enough to cool the engine without a large pressure drop at the cooling air exit, which drop is normally produced by increasing the drag of the cowl exit. In some large airplanes, such exit opening is controlled so that this large increase in drag is present only when required, i. e., during low airspeed, full-throttle flight. However, in the case of small airplanes, it is desirable to eliminate the cost and complication of movable cowl flaps and their control, with resultant increased airplane drag in all flight attitudes. This drag is very substantial, as indicated by the figures heretofore given, but is substantially entirely eliminated by the present invention embodying the combination with the features heretofore mentioned of one or more engine exhaust stacks 20 terminating in a nozzle 22 located within the inlet end of a tube 24 which leads to one of the air outlets 10. At its upper end, tube 24 is provided with an outwardly flared inlet 26 forming a bell mouth for the tube into which the stacks 20 extend with their nozzles 22 spaced from the walls of the tube to provide a surrounding air inlet passage. Thus tube 24, inlet 26 and nozzles 22 provide a jet pump device for lowering the pressure in the tube so as to draw the cooling air through the fins 19 and mix said air with the exhaust gases in the body of the jet pump, i. e., in the tube 24 below the bell mouth as shown, thereby cooling such gases and reducing their velocity as well as reducing both exhaust and mechanical noises (whose only open avenue of escape is through said tube) by any suitable acoustical sound-wave damping treatment of the interior of the jet pump so long as no objectionable exhaust gas and/or cooling air back-pressure results. To provide such acoustical treatment, the tube, below the bell mouth, may be perforate, as shown at 29, and completely surrounded circumferentially by an outside shell 30 which, because of low operating temperatures, may be made of relatively thin lightweight metal or even non-metallic fire-resistant sheet material. Preferably, there is included between said perforated tube and the imperforate outside shell a layer of fiberglass or stainless steel wool 28, for example, though the latter may be omitted and the device still function to damp sound-waves by virtue of the perforated tube.

The remaining portion of the tube 24 projecting from the end of the body of the pump is imperforate, as shown, so as to conduct the mixed air and exhaust gases to the opening 10 which may be, and preferably is, substantially flush with the external surface of the enclosed cowl 4. Such opening or openings 10 preferably provide the only escape for the cooling air, so that the mechanical noises as well as exhaust noises are thus suppressed or attenuated by reason of their passage through the jet pump-silencing unit just described.

Preferably, as shown, the bell mouth 26 of the tube is connected at its upper end to a casing 32 which substantially surrounds and encloses the engine cylinders which exhaust into the tube, this casing being provided with cooling air inlet openings 34 at the top through which the cooling air flows to the cylinders from inlets 6. Thus, bell mouth 26 of tube 24 is in effect continued to surround the cylinders which exhaust to the tube. Casing 32 acts not only to reduce mechanical engine noise by providing sound-deadening walls about the cylinders and valve gear, but also forms an effective fire-barrier which, together with tube 24 with which it connects, isolates the cylinders from the rest of the engine compartment, i. e., the rear or accessory section.

When employing the cylinder enclosing casing 32, I prefer to provide for a limited circulation of cooling air through the portion of the engine compartment external thereto, i. e., the accessory section. To this end, there are provided two openings 36 in the inner end wall of the casing through which air may flow into the casing from the outer compartment. One of these openings has an inlet pipe 38 into which the air flows through a conventional oil cooler unit 40. The other has an inlet pipe 42 having its inlet end located directly below the magneto 44. Cooling air flows into the rearward portion of the engine compartment through an inlet opening or openings 18a (preferably screened, as shown, and with suitable flame-proof screening) in the vertical baffle 18 and outwardly therefrom into casing 32 through pipes 38 and 42 and openings 36. The opening or openings 18a in the baffle 18 may also include sound-deadening means. The arrangement of pipes 38 and 42 as shown provides a high rate of cooling air flow through the oil cooler and about magnetos, generator, etc., as is desirable.

The casing 32, although advantageous, may be omitted, as in the modified and simpler construction shown in Fig. 4, in which parts corresponding to those of the preferred construction of Figs. 1 to 3 are designated by primes of the same reference numerals. In this construction, the bell mouth 26' is open to the engine compartment below the cylinders, drawing air therefrom as well as between the cylinders. The exhaust stacks 20' terminate in a single nozzle 22' located in the bell mouth 26' of tube 24'. The bell mouth, tube and nozzle are circular in cross-section. Such construction is entirely suitable, although I prefer to employ the cylinder casing construction of Figs. 1 to 3 for reasons previously stated, and although the rectangular cross-sectional shape of bell mouth, tube and nozzles shown in said figures is preferable to the circular cross-section, producing a somewhat better mixing of air and exhaust gases in the jet pump.

It will be seen from Fig. 4 and the description thereof that the jet pump is circular in cross-section and that its actual diameter therefore is the same as its so-called hydraulic diameter, i. e.

$$\left(\frac{2 \times \text{area}}{\text{perimeter}}\right)$$

making the ratio of length to hydraulic diameter of the order of several to one. In the construction as shown in Figs. 1 to 3, however, the jet pump is rectangular, and the ratio of aggregate length and connection to hydraulic diameter of the rectangularly-shaped passage thereof is about seventeen and a half (17½) to one.

In the engine installation as shown in the drawing, it will be seen that two separate units are provided inasmuch as it is usually somewhat more convenient with such an engine of flat horizontally opposed type to separately treat each opposing set of cylinders in the manner shown. In some instances, it may be more convenient to provide but a single unit instead of two units of the same as shown, whereas with other engines, particularly radial engines, more than two may be desired, though the essential features of the invention remain the same.

By this invention there is secured a very substantial improvement in total noise reduction (both exhaust and mechanical noise)—of the order of 20-30% over that obtained by the use of an ordinary exhaust muffler. Further, the jet pump materially increases the efficiency of the muffler because of the cooling and contracting of the exhaust gases, as heretofore mentioned. Preferably, and for maximum jet pump effectiveness, the velocity of the exhaust gases at the nozzle should be slightly less than the speed of sound and, since the exhaust ordinarily (at cruising speed or greater) exits from the engine ports at a speed somewhat above the speed of sound, and with the relatively short stacks required, the exhaust gas speed will be close to the speed of sound without the use of a throttling nozzle at the end of the stack. In this manner, the maximum pumping action can be obtained without appreciable engine-back pressure, and hence without material loss of power. Although the engine may slightly over-cool at speed above the speeds of best climb, no loss of power will result since, in any case, the exhaust energy is not recovered in the operation of an ordinary low-speed airplane.

In typical present-day small civil airplanes the three main sources of noise resulting from engine operation are from the propeller, engine exhaust, and engine mechanical noise. In the case of high-powered airplanes propeller noise predominates to such an extent that attempts to muffle engine exhaust are not worthwhile. In typical small airplanes, however, at cruising speed, the propeller noise is of the order of 65 decibels with an overall noise level of the order of 85–95 decibels. The present device aims, by reducing the remainder of the noise producing elements to the noise level of the propeller, to provide such highly desirable reduction of sound level, for example, to 65–70 decibels, or thereabouts. This advantageous result can readily be secured by proper utilization of the invention as heretofore described. The jet pump silencing units of this invention allow for such noise-sealing with adequate cooling, muffling of all engine noises, exhaust and mechanical, and elimination of the usual unsightly and drag-inducing gap in the cowl for the escape of cooling air, thus providing an aerodynamically clean design as well as eliminating openings permitting dripping of oil or the like from the engine compartment.

This application is a continuation in part of my prior application, Serial No. 537,639, filed May 27, 1944, now abandoned.

Having described my invention, what I claim is:

1. A powered aircraft having in combination, a fuselage, a multi-cylinder engine, a substantially continuous envelope providing an enclosure wholly surrounding said engine, said enclosure having an air inlet therein for admission of cooling air to said engine and presenting an aerodynamically clean form merging smoothly with the lines of said fuselage, an inner casing at least partially surrounding the cylinders of said engine, engine-cylinder heat-transfer means including circumferential fins arranged to conduct circumferentially around the cylinders a flow of cooling air received from said air inlet in said enclosure, a jet-pump in said enclosure including at least one nozzle, a jet pump body surrounding said nozzle and providing a substantially direct passage therethrough connected to an outlet open to the outside air, and a jet pump air-inlet, jet-pump connecting means communicating with said inner casing providing a continuation and forming an extension thereof for conducting spent cooling air from said cylinders to said jet-pump inlet, exhaust piping to conduct exhaust gases to jet-pump nozzle, said jet pump being adapted and arranged to induce the flow of cooling air into said enclosure, around said engine cylinders, through said casing and connecting means, and into said jet-pump passage and there mix it with said exhaust gases and together discharge through said outlet, and exposed sound-absorbing means surrounding said jet-pump passage between its inlet and outlet ends whereby both engine exhaust and engine mechanical noises are minimized during their movement through said jet-pump body.

2. A powered aircraft having in combination, a fuselage, a multi-cylinder engine, a substantially continuous envelope providing an enclosure wholly surrounding said engine, said enclosure having an air inlet therein for admission of cooling air to said engine, and presenting an aerodynamically clean form merging smoothly with the lines of said fuselage, an inner casing at least partially surrounding the cylinders of said engine, engine-cylinder heat-transfer means including circumferential fins arranged to conduct circumferentially around the cylinders a flow of cooling air received from said air inlet in said enclosure, a jet-pump in said enclosure including at least one nozzle, a jet pump body surrounding said nozzle and providing a substantially direct passage therethrough connected to an outlet open to the outside air, and a jet pump air inlet, jet-pump connecting means communicating with said inner casing providing a continuation and forming an extension thereof for conducting spent cooling air from said cylinders to said jet-pump inlet, exhaust piping enclosed within said jet-pump extension to conduct exhaust gases to said jet-pump nozzle, said jet pump being adapted and arranged to induce the flow of cooling air into said enclosure, around said engine cylinders, through said casing and connecting means, and into said jet-pump passage and there mix it with said exhaust gases and together discharge through said outlet, and exposed sound-absorbing means surrounding said jet-pump passage between its inlet and outlet ends whereby both engine exhaust and engine mechanical noises are minimized during their movement through said jet-pump body.

3. A powered aircraft having in combination, a fuselage, a multi-cylinder engine, a substantially continuous envelope providing an enclosure wholly surrounding said engine, said enclosure having an air inlet therein for admission of cooling air to said engine, an inner casing at least partially surrounding the cylinders of said engine, engine-cylinder heat-transfer means including circumferential fins arranged to conduct circumferentially around the cylinders a flow of cooling air received from said air inlet in said enclosure, a jet-pump in said enclosure including at least one nozzle, a jet pump body surrounding said nozzle and providing a direct and unobstructed passage of substantially unreduced size therethrough to the outside air, and a jet pump air inlet, a jet-pump connecting means communicating with said inner casing providing a continuation and forming an extension thereof for conducting spent cooling air from said cylinders to said jet-pump inlet, exhaust piping to conduct exhaust gases to a jet-pump nozzle, said jet pump being adapted and arranged to induce the flow of cooling air into said enclosure, around said engine cylinders, through said casing and connecting means, and into said jet-pump passage and there mix it with said exhaust gases, and exposed sound-absorbing means surrounding said jet-pump passage between its inlet and outlet ends whereby both engine exhaust and engine mechanical noises are minimized during their movement through said jet-pump body.

4. A powered aircraft having in combination, a fuselage, a multi-cylinder engine, a substantially continuous envelope providing an enclosure wholly surrounding said engine, said enclosure having an air inlet therein for admission of cooling air to said engine, an inner casing at least partially surrounding the cylinders of said engine, engine-cylinder heat-transfer means including circumferential fins arranged to conduct circumferentially around the cylinders a flow of cooling air received from said air inlet in said enclosure, a jet-pump in said enclosure including at least one nozzle, a jet pump body surrounding said nozzle and providing a substantially direct passage therethrough, and a jet pump air inlet, jet-pump connecting means communicating with said inner casing providing a continuation and forming an extension thereof for conducting spent cooling air from said cylinders to said jet-pump inlet, exhaust piping to conduct exhaust gases to a jet-pump nozzle, said jet pump being adapted and arranged to induce the flow of cooling air into said enclosure, around said engine cylinders, through said casing and connecting means, and into said jet-pump passage and there mix it with said exhaust gases, the aggregate length of said passage and its connection to the outside air being at least several times the hydraulic diameter of said passage, and exposed sound-absorbing material surrounding said jet-pump passage between its inlet and outlet ends whereby both engine exhaust and engine mechanical noises are minimized during their movement through said jet-pump body.

5. A powered aircraft having in combination, a fuselage, a multi-cylinder engine, a substantially continuous envelope providing an enclosure wholly surrounding said engine, said enclosure having an air inlet therein for admission of cooling air to said engine, an inner casing at least partially surrounding the cylinders of said engine, engine-cylinder heat-transfer means including circumferential fins arranged to conduct circumferentially around the cylinders a flow of cooling air received from said air inlet in said enclosure, a jet-pump in said enclosure including at least one nozzle, a jet pump body surrounding said nozzle and providing a substantially direct passage therethrough, and a jet pump air inlet, jet-pump connecting means communicating with said inner casing providing a continuation and forming an extension thereof for conducting spent cooling air from said cylinders to said jet-pump inlet, exhaust piping to conduct exhaust gases to a jet-pump nozzle, said jet pump being adapted and arranged to induce the flow of cooling air into said enclosure, around said engine cylinders, through said casing and connecting means, and into said jet-pump passage and there mix it with said exhaust gases, the aggregate length of said passage and its connection to the outside air being several times but not to exceed seventeen and one-half times the hydraulic diameter of said passage, and exposed fire-resistant sound-absorbing material surrounding said jet-pump passage between its inlet and outlet ends whereby both engine exhaust and engine mechanical noises are minimized during their movement through said jet-pump body.

6. A powered aircraft having in combination, a fuselage, a multi-cylinder engine, a substantially continuous envelope providing an enclosure wholly surrounding said engine, said enclosure having an air inlet therein for admission of cooling air to said engine, an inner casing at least partially surrounding the cylinders of said engine, engine-cylinder heat-transfer means including circumferential fins arranged to conduct circumferentially around the cylinders a flow of cooling air received from said air inlet in said enclosure, a jet-pump in said enclosure including at least one nozzle, a jet pump body surrounding said nozzle and providing a substantially direct unobstructed passage therethrough, and a jet pump air inlet, jet-pump connecting means communicating with said inner casing providing a continuation and forming an extension thereof for conducting spent cooling air from said cylinders to said jet-pump inlet, exhaust piping enclosed within said jet-pump extension to conduct exhaust gases to said jet-pump nozzle, said jet pump being adapted and arranged to induce the flow of cooling air into said enclosure, around said engine cylinders, through said casing and connecting means, and into said jet-pump passage and there mix it with said exhaust gases, a direct connection from said passage to an outlet open to the outside air, the cross-sectional area of said connection and outlet being at least as large as that of said passage, and exposed sound-absorbing material surrounding said jet-pump passage between its inlet and outlet ends whereby both engine exhaust and engine mechanical noises are minimized during their movement through said jet-pump body.

7. A powered aircraft having in combination, a fuselage, a multi-cylinder engine, an enclosure for said engine, said enclosure having an air inlet therein for admission of cooling air to said engine, baffle means at least partially surrounding and baffling the cylinders of said engine for confining and guiding cooling air thereto, engine-cylinder heat-transfer means including circumferential fins arranged to conduct circumferentially around the cylinders a flow of cooling air received from an air inlet, a jet-pump in said enclosure including a nozzle, a jet pump body providing a substantially unobstructed direct passage therethrough to the outside air, and a converging jet pump air inlet means for receiving and conducting spent cooling air from said cylinders to said jet-pump body, piping to conduct exhaust gases to said nozzle, said jet pump being adapted and arranged to induce the flow of cooling air into said enclosure, around said engine cylinders, and into said jet-pump passage and there mix it with said exhaust gases, and exposed sound-absorbing means surrounding said jet-pump passage between its inlet and outlet ends whereby engine exhaust gas noises are minimized during their movement through said jet pump body.

8. A powered aircraft as claimed in claim 7 in which said multi-cylinder engine is of horizontally opposed type with a set of cylinders on each side bank thereof, each set having a separate jet-pump therefor.

9. A powered aircraft as claimed in claim 7 in which said multi-cylinder engine is of horizontally opposed type with a set of cylinders on each side bank thereof, each set having a separate jet-pump therefor and each jet-pump body having a plurality of exhaust nozzles therein.

OTTO C. KOPPEN.

Certificate of Correction

Patent No. 2,410,856. November 12, 1946.

OTTO C. KOPPEN

It is hereby certified that error appears in the printed specification of the above numbered patent requiring correction as follows: Page 1, second column, line 30, for the word "exists" read *exits*; and that the said Letters Patent should be read with this correction therein that the same may conform to the record of the case in the Patent Office.

Signed and sealed this 14th day of January, A. D. 1947.

[SEAL]

LESLIE FRAZER,
*First Assistant Commissioner of Patents.*